United States Patent
Nardi et al.

(10) Patent No.: US 6,747,075 B2
(45) Date of Patent: Jun. 8, 2004

(54) SIMULATED LIMESTONE AND METHOD OF PRODUCING THE SAME

(75) Inventors: John T. Nardi, Gallatin, TN (US); James P. Harper, Jr., Hermitage, TN (US)

(73) Assignee: Cultured Trim, Inc., Hendersonville, TN (US)

( * ) Notice: Subject to any disclaimer, the term of this patent is extended or adjusted under 35 U.S.C. 154(b) by 0 days.

(21) Appl. No.: 10/256,774

(22) Filed: Sep. 27, 2002

(65) Prior Publication Data

US 2003/0059558 A1 Mar. 27, 2003

Related U.S. Application Data

(60) Provisional application No. 60/326,008, filed on Sep. 27, 2001.

(51) Int. Cl.$^7$ ............................... C08J 3/00; C08J 9/32; C08K 3/34; C08K 11/00; C08L 67/00
(52) U.S. Cl. ........................... 523/218; 264/73; 264/76; 264/77; 523/219; 524/401; 524/425; 524/437; 524/442; 524/513
(58) Field of Search ............................. 264/73, 76, 77; 523/218, 219; 524/401, 425, 437, 442, 513

(56) References Cited

U.S. PATENT DOCUMENTS

| 4,043,826 A | 8/1977 | Hum |
| 4,235,948 A | 11/1980 | Holmes |
| 4,346,050 A | 8/1982 | Trent et al. |
| 4,446,177 A | * 5/1984 | Munoz et al. |
| 4,473,673 A | 9/1984 | Williams et al. |
| 4,956,030 A | 9/1990 | Baskin |
| 5,055,327 A | 10/1991 | Baskin |
| 5,244,941 A | 9/1993 | Bruckbauer et al. |
| 5,275,852 A | 1/1994 | Jones et al. |
| 5,422,391 A | 6/1995 | Inoue |
| 5,473,851 A | 12/1995 | Northrup, Jr. |
| 5,478,390 A | 12/1995 | Cruaud et al. |
| 5,634,307 A | 6/1997 | Larriberot et al. |
| 5,762,864 A | 6/1998 | Park |
| 5,787,667 A | 8/1998 | Sheahan et al. |
| 6,028,127 A | 2/2000 | Yanagase et al. |
| 6,054,080 A | 4/2000 | Sheahan et al. |
| 6,132,820 A | 10/2000 | Callahan |

* cited by examiner

Primary Examiner—Patrick D. Niland
(74) Attorney, Agent, or Firm—Waddey & Patterson; Douglas W. Schelling

(57) ABSTRACT

The present invention discloses a simulated limestone, a method of producing the simulated limestone, and a method of achieving a surface texture. The simulated limestone has been specifically formulated and designed in order to overcome the currently existing problems of other simulated or artificial stones that are currently available. The invention additionally discloses a method of producing the simulated limestone which provides unique characteristics. Also disclosed, is a method of preparing a surface texture which provides a product having the enhanced appearance of natural limestone. Both methods disclosed herein may be completed in a time efficient manner and produce a simulated limestone having the appearance of natural limestone and other benefits described herein.

20 Claims, 3 Drawing Sheets

SIMULATED LIMESTONE AND METHOD OF PRODUCING THE SAME

This original utility patent application claims benefit of co-pending U.S. Provisional Patent Application Serial No. 60/326,008 filed Sep. 27, 2001, entitled "Formulation to Produce Architectural Detailed Components," which is hereby incorporated by reference.

Be it known that I, John T. Nardi, a citizen of the United States, residing at 109 Grassland Drive, Gallatin, Tenn. 37066; James P. Harper, Jr., a citizen of the United States, residing at 609 Baton Rouge Ct, Hermitage, Tenn. 37076; have invented a new and useful "Simulated Limestone and Method of Producing the Same."

BACKGROUND OF THE INVENTION

Simulated stones have been used to enhance the appearance of the external cladding surfaces of buildings. As a means of background, the following information generally describes the features and characteristics of simulated or artificial stone or decorative displays that are currently in use. However, the currently known information does not solve the problems which have been solved by the present invention.

Historically, carved limestone has been a preferred material for trim surrounds, fireplaces, and other architectural features, for use with brick or natural stone. Additionally, carved limestone is frequently used on commercial buildings and residential development projects. However, one of the major disadvantages of carved limestone is weight. As a result, it is very costly to ship, install, and handle by workmen, and depending upon the size, may require the use of machinery to lift it.

There have been many previous efforts to develop a suitable alternative that has the aesthetic advantages of the natural stone, but not the disadvantages. Some of these efforts include E.I.F.S. (Exterior Insulated Finish Sytems) made by Drvvit or Senergy, or pre-cast concrete made by Tannertone, or lamenated foam by Fypon. Each of these products attempt to provide the advantages of limestone but sacrifice either design flexibility, structural integrity, or long-term durability.

An example of another previous effort is U.S. Pat. No. 6,054,080, to Sheahan et al., the contents of which are incorporated herein by reference in its entirety. This patent discloses a casting produced from a mixture of graded aggregates and a polyester resin binder.

Other examples of attempts are disclosed in U.S. Pat. No. 4,346,050, to Trent et al., U.S. Pat. No. 4,473,673, to Williams et al., U.S. Pat. No. 5,275,582, to Jones et al., U.S. Pat. No. 5,422,391 to Inoue, and U.S. Pat. No. 5,478,390 to Cruaud et al.

The Trent patent is directed to an improved concrete product having a very low viscosity (no more than about 50 centipoise) polyester resin binder so that the concrete will have higher strength and other improved properties such as high modulus of elasticity, low thermal expansion and contraction, better fire resistance and low shrinkage on curing. The improved concrete product disclosed in this patent is intended for use in the production of pre-cast elements for architectural or engineering applications in building construction. In order to achieve different surface appearances for various architectural uses, the surface of the concrete product described in this patent can be treated or etched with any solvent for the polymer binder so that an exposed aggregate effect is obtained.

The Williams patent is concerned with the production of a simulated or cultured marble product, and mixes an unsaturated polyester resin having a viscosity of about 300–600 centipoise (CPI) with a solid filler material such as calcium carbonate and then subjects the composition to a three step process, i.e., evacuating, vibrating and shearing under carefully controlled and limited conditions. The resulting product has a smooth, glossy surface finish and is particularly suitable for use in making countertops, bathroom sinks, table tops, lamps, etc.

The Jones patent is concerned with a simulated stone product for use as a basic building component and uses a resin binder with sodium chloride particles, pigments and other fillers to yield desired aesthetic effects. The mixture is cast in a mold that has been coated with a gel coat to produce countertops, sinks, tubs, etc. The resulting product has a glossy surface finish, and because of the use of sodium chloride has a high degree of whiteness.

The patent to Inoue describes a method of making a high density artificial stone having physical properties similar to those of natural stone, e.g., marble. In producing his product, Inoue molds a mixture of natural stone particles with calcium carbonate filler and a resin binder. Various colors may be given to the finished product by using colored particulate materials, or introducing pigments. The surface of the cast product is processed with an organic solvent to remove resins. Alternatively, the surface may be given an uneven texture by scraping the surface with a wire brush or the like, or spraying it with a high pressure water jet.

The patent to Cruaud relates to a process of making cuttable concrete having hardness and other properties permitting its use in ways that conventional concrete may be used, but having the additional property of being cuttable with conventional sculpting tools. After it is cast, the concrete product may be sandblasted to imitate the external appearance of a natural stone.

Finally, other examples include the following, all of which are incorporated by reference in their entirety: U.S. Pat. No. 4,235,948, to Holmes, U.S. Pat. No. 6,028,127, to Yanagase et al., U.S. Pat. No. 5,244,941, to Bruckbauer et al., U.S. Pat. No. 5,762,864, to Park, U.S. Pat. No. 6,132,820, to Callahan, U.S. Pat. No. 4,043,826, to Hum, U.S. Pat. No. 5,055,327, to Baskin, U.S. Pat. No. 4,956,030, to Baskin, U.S. Pat. No. 5,634,307, to Larriberot et al., U.S. Pat. No. 5,787,667, to Sheahan et al., and U.S. Pat. No. 5,473,851, to Northrup, Jr.

What is needed, then, is a simulated limestone which feels and looks like real limestone, which overcomes the currently existing problems identified. Additionally, what is needed is a method of producing such simulated limestone with repeatable quality, time efficiency, and in a cost effective manner. Finally, what is also needed is a method of achieving a surface texture which provides a simulated limestone appearance with a matted, or duller, finish having an enhanced appearance of natural limestone. Additionally, what it is needed is the ability to provide various earth-tone type colors.

SUMMARY OF THE INVENTION

This invention relates to the field of synthetic architectural detailed components for the commercial and residential industry including all related architecturally designed features. Preferably, the components of the present invention simulate limestone. The present invention is designed to provide the benefits and features of simulated limestone and overcome many of the problems that exist in the field today.

Products of the present invention include synthetic architectural detailed components, and more particularly to exterior trim components for residential, commercial, or industrial buildings. Preferably the components of the present invention simulate limestone by look, feel and color.

The present invention additionally discloses a method of producing a simulated limestone, and a method of achieving a matted, or dull, surface texture, surprisingly similar to natural limestone. Each method results in the production of a product with an enhanced appearance of natural limestone. Briefly, the method of producing simulated limestone comprises providing a mold, and pouring a formulation of a polymer based resin system with various fillers, aggregates, and pigments into the mold.

The method of achieving a surface texture comprises utilizing a 15 lb density foam material, or equivalent. The foam material is machined to have the desired engineered shape in order to provide a male model, also referred to herein as a model. In certain embodiments, the model is then enclosed with a wood framing material such that the top remains exposed. The male model is prepared to receive a polyurethane rubber material, as commonly known in the art. The polyurethane rubber is poured over the male model until the male model is covered and the enclosed box is completely full. In general, the polyurethane rubber is poured approximately an 1½" over the top surface of the model to create the base of the mold when rotated for molding purposes. The polyurethane rubber is allowed to solidify over a 24 hour period and the result is a female mold that is stripped from the original male model. The female mold provides a cavity such that a simulated limestone formulation, disclosed herein, may be poured into the female mold.

Accordingly, one object of the present invention is to provide a simulated limestone having the appearance of natural limestone and being resistant to damage by ultraviolet light, fire, extreme temperatures, water, and most acids. This will allow increased longevity of the product as comparison to other available products.

Another object of the present invention is to provide a simulated limestone having a reduced weight as compared to natural limestone. The reduction in weight will increase the ease of installation and reduce overall cost to the consumer for shipping and installation.

Another object of the present invention is to provide simulated limestone having compression strength. This provides and strong advantage because most alternative products are cosmetic only and not capable of performing structural functions. The present simulated limestone has the ability to withstand load bearing situations, like a brick wall.

Still another object of the present invention is to provide a simulated limestone that has a low coefficient to thermal expansion and contraction, and is resistant to damage by impact. Most alternative products cannot withstand the impact of a projectile, such as a baseball or rock.

Another object of the present invention is to provide a method of producing a simulated limestone, wherein the method produces a product having the appearance of natural limestone in a cost effective and time efficient manner through manufacturing automation techniques. The formulation is designed to be mass produced which cannot be done by the majority of limestone quarries or pre-cast manufactures. The disadvantage of pre-cast concrete is that the part must stay in the mold for at least 24 hours until it reaches "green" strength to be able to demold. The disadvantage of natural limestone is that it requires sophisticated equipment to machine the natural limestone to a particular profile.

Still another object of the present invention is to provide a method for achieving a surface texture, wherein the method produces a product having a surprisingly enhanced appearance of natural limestone. The method of achieving a surface texture is non-complicated, cost effective, and surprisingly time efficient.

BRIEF DESCRIPTION OF THE DRAWINGS

FIG. 2 depicts use of the invention as trim for an arched window. The simulated limestone 10 is attached to the external surface of a structure 18. As described herein, the simulated limestone 10 may be used in a variety of ways on a variety of buildings, such as residential, commercial, or industrial.

FIG. 3 is a schematic drawing of a cross sectional view of the simulated limestone 10. The figure depicts the contents of the hardened matrix 12, which includes a polyester resin, alumina trihydrate, microspheres 14, sand 16, pigment, and MEKP-9. The microspheres 14 and sand 16 are shown independent from the matrix 12.

FIG. 4 is a flow diagram showing the steps of the method for achieving a surface texture. A foam material is machined into a desired shape so that a male model 20 is formed. The male model 20 is placed on the bottom surface of a container 21 that is used to hold a liquefied polyurethane rubber material. The polyurethane rubber material is poured into the container 21 so that the polyurethane rubber material hardens to form a female mold 22. After the female mold 22 is separated from the container 21 and the male model 20, then a simulated stone material, as disclosed herein, is poured into the cavity 23 of the female mold 22. A textured simulated stone 24 having the shape and texture of the female mold 22 is produced.

DESCRIPTION OF THE PREFERRED EMBODIMENTS

The present invention discloses a simulated limestone, also known as artificial limestone, methods of producing the simulated limestone, and a method of achieving a surface texture. The simulated limestone comprises a base polyester resin, alumina trihydrate, microspheres, sand, pigment, and a catalyst. The simulated limestone is specifically designed and formulated in order to overcome the problems associated with the previously available artificial stones.

The invention additionally discloses a method of producing the simulated limestone. Briefly, the method comprises providing a mold, and pouring a formulation of the simulated limestone material, which is described herein, into the mold. The present invention additionally discloses a method of achieving a surface texture. The method comprises machining a foam material into a desired shape, placing the foam material in a container, pouring a polyurethane rubber material into the container and over the machined foam, allowing the polyurethane rubber material to solidify and form a female mold 22, and pouring a formulation described herein, of the simulated limestone into the hardened polyurethane rubber material which is female mold.

As used herein, "weight in weight" is a phrase used to describe the concentration of a substance in a mixture. For example, 5% w/w means that the weight of the substance is equal to 5% of the total weight of the mixture. w/w is an abbreviation for "weight in weight."

As used herein, "weight in volume" is used to describe the concentration of a substance in a mixture or solution. The weight in volume is the mass (in grams) of the substance dissolved in or mixed with 100 milliliters of solution or mixture. For example, 1% w/v is equal to 1 gram per deciliter (g/dL) or 10 grams per liter (g/L). w/v an abbreviation for "weight in volume."

As used herein, "volume in volume" is used to describe the concentration of a substance in a mixture or solution. For example, 2% v/v means that the volume of the substance is 2% of the total volume of the solution or mixture. v/v an abbreviation for "volume in volume."

As used herein, "extreme temperatures" means a temperature of between 100° F. and 200° F.

As used herein, "most acids" means acids similar to muratic acid, which is used to clean excess dried mortar from brick. Briefly, if too much muratic acid is used around limestone or pre-cast concrete, the acid will dissolve the lime away.

As used herein, "foam material" means a 15 pound density foam or equivalent. Equivalents include, but are not limited to, other variations of density, including 10 lb to 20 lb. The density of the foam also relates to the amount of air that is removed during the manufacturing of the foam. The denser the foam, the less air the foam has thus increasing the density weight. In addition, the higher the density, the stronger the foam. This is necessary in order to strip the polyurethane rubber from the model. Foam material that may be used as described herein is commercially available from Advanced Plastics, 7360 Cockrill Bend Blvd, Nashville Tenn., 37209.

As used herein, "machining" means utilizing a mathematical model generated from CAD software to produce a geometric design. The mathematical model is translated into reality by placing a foam material on a CNC machine to cut-away the material to the mathematical geometry. The result is that the foam material is manipulated to provide the desired shape. The type of equipment generally used to "machine" the foam is a CNC routing table. "Machining" of the foam is available through H&H Tool, Inc, 31 Industrial Park Dr., Hendersonville, Tenn. 37075.

As used herein, "polyurethane rubber material" means a two part resin system that, when mixed together, provides properties similar to rubber. For example, it does not shrink, can withstand high temperatures, and is flexible in nature to be able to demold, or pull away from, a simulated limestone part. The term "polyurethane rubber material" also includes equivalents that are capable of performing the above listed functions. The purpose of this type of the rubber is that is can withstand high exotherm temperatures in excess of the 180° F. and maintains the exact geometry, or shape, without shrinking from the exotherm heat over time. Such quality allows for manufacturing repeatability.

As used herein, "exotherm cure" means the heat generated as a result of the chemical reaction of adding the catalyst to the limestone formulation.

As used herein, "microsphere" has the same meaning as commonly understood by one of ordinary skill in the art. A microsphere's purpose is to reduce the weight of the overall formulation since the material has a light weight. Additionally, on a microscopic level, a microsphere will find and fill voids in the crosslink that normal fillers will not be to fill due to particle size. As a result, a microsphere will fill voids in the matrix that other fillers do not. This function results in bulking the overall mixture and decreasing the weight. "Bulking" refers to the increase in overall mass of the formulation without adding additional resin, fillers, or aggregates. The result is a reduction in weight.

Unless otherwise defined, all technical and scientific terms used herein have the same meaning as commonly understood by one of ordinary skill in the art to which the invention pertains. Although methods and materials similar or equivalent to those described herein can be used in the practice or testing of the present invention, the preferred methods and materials are described below. All publications, patent applications, patents, and other references mentioned herein are incorporated by reference in their entirety. Unless otherwise indicated, materials, methods, and examples described herein are illustrative only and not intended to be limiting.

Figure 1:
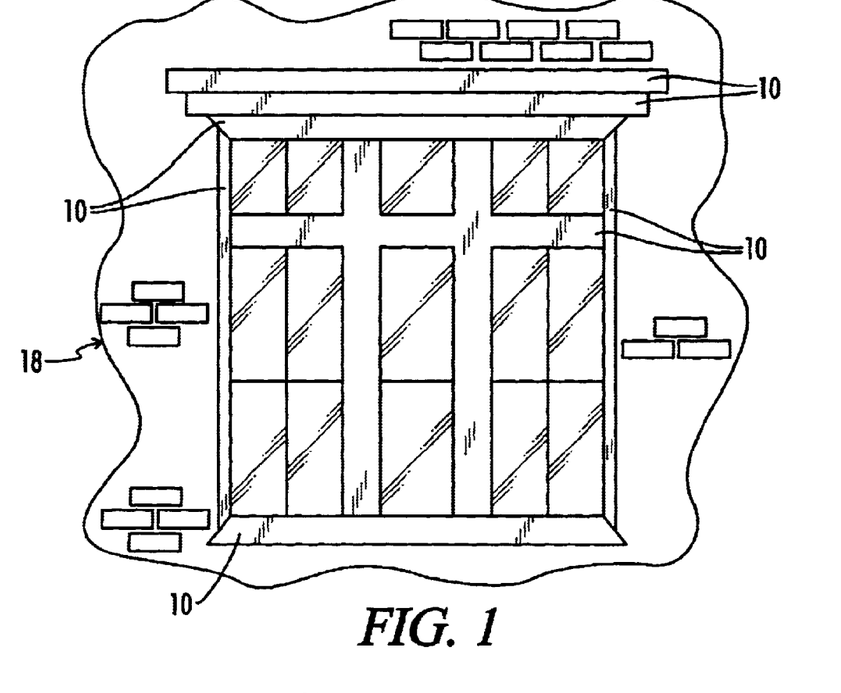
FIG. 1 depicts use of the invention as a trim surround. The simulated limestone 10 is attached to the external surface of a structure 18.
Figure 2:
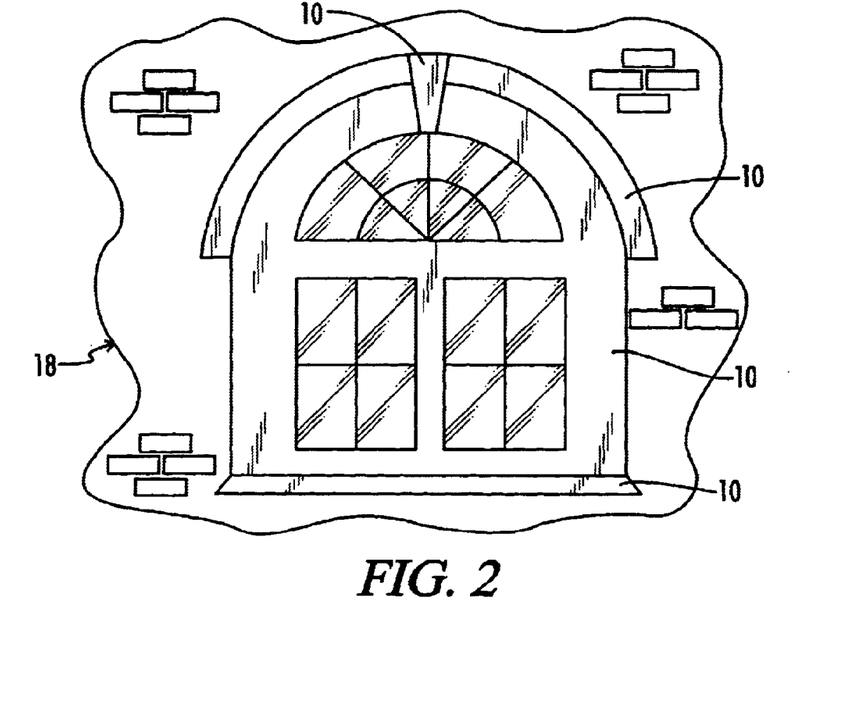

As shown in FIG. 1 and FIG. 2, the simulated limestone 10, also known as artificial limestone, is used to enhance the aesthetic value of private residential structures, commercial structures, and industrial structures. FIG. 1 shows the simulated limestone 10 being used as a trim surround on an external surface of a structure 18, such as a private residence. The simulated limestone 10 may be used in a similar manner on either a commercial or industrial structure. FIG. 2 shows use of the simulated limestone 10 as trim for an arched window to enhance the appearance of the external surface of a structure 18. The simulated limestone 10 disclosed herein may be used in any manner which enhances the aesthetic value of the external surface of any of the aforementioned structures. More specifically, by way of illustration, but not limitation, the simulated limestone 10 may be used as headers, trim surrounds, keystones, quoins, balustrade, sign panels, water tables, or column caps.

Figure 3:
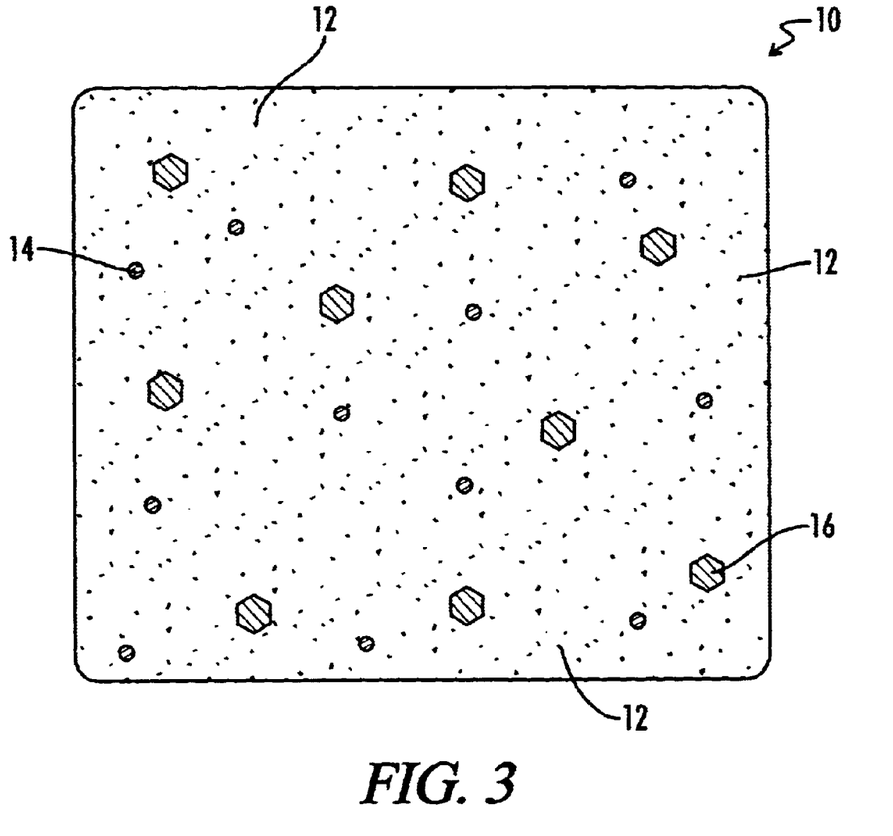

The simulated limestone 10 comprises a hardened and solid matrix which is produced by the combination of multiple components. FIG. 3 provides a schematic drawing of a cross sectional view of a portion of the simulated limestone 10. The FIG. 3 shows the presence of the components of the simulated limestone 10, which include a polyester resin, alumina trihydrate, microspheres, sand, pigment, and a catalyst. The presence of the polyester resin, alumina trihydrate, pigment, and catalyst are represented by the matrix 12 of the simulated limestone 10. Also contained within the simulates tone apparatus 10, are microspheres 14 and sand 16. FIG. 3 does not represent all of the formulations of the simulated limestone 10 which are disclosed herein. The specific concentration, or amount, of each component of the simulated limestone 10 will depend upon the specific formulation used, and will depend upon the ultimate characteristics which are desired for that specific simulated limestone 10. Disclosed herein are multiple formulations for producing the simulated limestone 10. As the formulation of the simulated limestone 10 is modified, as disclosed within this document, the result is simulated limestone having different characteristics which are advantageous to the end user.

The simulated limestone 10 requires a base polyester resin. The base polyester resin has a viscosity of about 375–425 centipoise (CPI), as measured by a Brookfield Model LVF No. 2 spindle at 60 rpm. In certain embodiments, the base polyester resin is a polyester resin, having the above-mentioned CPI characteristic. Such material may be provided by any commercial source. In other embodiments, the commercially available brand of AROPOL™ is used as the base polyester resin. AROPOL™ is available from Ashland Specialty Chemical, 5200 Blazer Parkway, Dublin, Ohio 43017. Other polyester resins are known in the art and may be used in the present invention if they meet the resin characteristics further described below.

In certain embodiments of the present invention, from about 30% w/w to about 40% w/w of the base polyester resin is used. In still other embodiments, from about 15% w/w to about 40% w/w of the base polyester resin is used. In preferred embodiments of the present invention, the percentage of the base polyester resin is about 40% w/w, 34% w/w, 30% w/w or 27% w/w of the final simulated limestone 10. In still other embodiments, from about 15% w/w to about 20% w/w of the base polyester resin is used. In other embodiments, from about 20% w/w to about 30% w/w of the base polyester resin is used.

The base polyester resin to be used in the disclosed invention should have several additional characteristics. As described above, the polyester resin should have a viscosity of about 375–425 CPI such that multiple fillers may be used and the settling of aggregate sand is prohibited. Next, the polyester resin should provide ultraviolet light resistance such that the simulated limestone 10 does not discolor due to long term exposure to ultraviolet light. Additionally, the final product needs to be fire resistant. The polyester resin additionally must function to prohibit or minimize warping of the simulated limestone 10, prohibit the expansion or contraction of the simulated limestone 10 over time, and must be able to be pigmented. Finally, the polyester resin should provide a cure time of between eight (8) to ten (10) minutes. However, it is noted that the cure time can be reduced or enlarged based upon the specific manufacturing needs.

As described above, alumina trihydrate is another component of the simulated limestone 10. In certain embodiments of the present invention, from about 10% w/w to about 20% w/w of alumina trihydrate is present in the simulated limestone 10. In still other embodiments, from about 10% w/w to about 40% w/w of alumina trihydrate is present. In still other embodiments, it is preferable that from about 20% w/w to about 30% w/w of alumina trihydrate is present in the simulated limestone 10. In still other embodiments, it is preferable to have about 20% w/w, 16% w/w, 13% w/w, or 10% w/w of alumina trihydrate in the simulated limestone 10.

Alumina trihydrate is added to the simulated limestone 10 in order to function as a filler. It also functions as a substance to provide fire resistance. Without the alumina trihydrate, the simulated limestone 10 would be extremely brittle and flammable. Alumina trihydrate is commercially available Advanced Plastic, 7360 Cockrill Bend Blvd, Nashville, Tenn. 37209 or Walsh & Associates 3920 Delp Street, Memphis, Tenn. 38118.

Another component of the simulated limestone 10 is the microsphere 14. Microspheres 14 are used as bulking material that ultimately reduce the weight of the simulated limestone 10 and allow for an increased volume of the mixture to be used to prepare the simulated limestone 10. Additionally, the microspheres 14 also improve the settling conditions while the materials used to produce the simulated limestone 10 are being mixed. In certain embodiments of the present invention, from about 5% w/w to about 15% w/w of the simulated limestone 10 is microspheres 14. In other embodiments of the present invention, from about 10% w/w to about 40% w/w of the simulated limestone 10 is microspheres 14. In still another embodiments of the present invention, from about 25% w/w to about 40% w/w of the simulated limestone 10 is microspheres 14. In a preferred embodiment, the microspheres 14 comprise about 16% w/w of the simulated limestone 10. In another preferred embodiment, the microspheres 14 comprise about 20% w/w of the simulated limestone 10. In still another preferred embodiment, the microspheres 14 comprise about 23% w/w of the simulated limestone 10. In another preferred embodiment, the microspheres 14 comprise about 12% w/w of the simulated limestone 10. In another preferred embodiment, the microspheres 14 comprise about 12–23% w/w of the simulated limestone 10.

The microspheres 14 may be constructed of glass, ceramic material, or thermal plastic material. In certain embodiments, ceramic microspheres are used. In other embodiments, glass microspheres are used. In still other embodiments, thermoplastic microspheres are used. Regardless of the material used to construct the microspheres 14, the function of the microspheres 14 of weight reduction and serving as a "filler" remains the same. The shape of the microspheres 14 is generally hollow and spherical in nature. In certain embodiments of the present invention, the microspheres 14 have a size from about 0.65–0.95 grams/cc for limestone color, which allow the microspheres 14 to perform the above-mentioned functions. In still other embodiments, the microspheres 14 have a size of 0.43–0.49 grams/cc for white color. In other embodiments, the microspheres 14 may be constructed of a material that is equivalent to the microspheres 14 constructed of glass, ceramics, or thermal plastics. In a preferred embodiment, the microspheres 14 are constructed of 95–99.9% ceramic and 0.1–5% quartz silica.

In still another embodiment, the microspheres 14 are constructed of glass. Glass microspheres are commercially available from William Tabler Company, Inc. 1331 South 15$^{th}$ Street, Louisville, Ky. 40210 Ceramic microspheres are commercially available from William Tabler Company, Inc., 1331 South 15$^{th}$ Street, Louisville, Ky. 40210. Thermal plastic microspheres are also well known in the art.

Still another component of the simulated limestone 10 is sand 16. The term "sand" as used herein may refer to either masonry sand or other sand or other particulate matter that may be used in the invention as described herein. Additionally, the term masonry sand is also referring to masonry sand, sand, or other particulate matter that may be used. So the terms sand and masonry sand may be used interchangeably. The function of the sand 16 is to provide the aggregate look of the simulated limestone 10. In the absence of the sand 16, the simulated limestone 10 would have the appearance of plastic rather than the appearance of replicated limestone. Additionally, the sand 16 adds density to the simulated limestone 10. In certain embodiments of the present invention, from about 10% w/w to about 20% w/w of the simulated limestone 10 is sand 16. In still other embodiments of the present invention, from about 10% w/w to about 30% w/w of the simulated limestone 10 is sand 16. In another embodiment of the present invention, from about 20% w/w to about 30% w/w of the simulated limestone 10 is sand 16. Preferably, the sand 16 constitutes about 20% w/w of the simulated limestone 10. In another preferable embodiment, the sand 16 constitutes about 27% w/w of the simulated limestone 10.

The sand 16 used in the production of the simulated limestone 10 normally has a spherical or oblong rock shape. It is important that the sand 16 is dry. It is also important that the sand 16 is sifted to exclude any abnormally large particles. Briefly, the purpose of providing the dry and semi-uniform sized sand 16 is to prevent warping and to promote uniform chemical reactions. Any abnormally large particles will create voids in the matrix. In certain embodiments, the sand 16 has a fineness modulus of 1.7. In other certain embodiments, the sand 16 has a fineness modulus of 1.0 to 2.0. Sand 16 having the above-mentioned characteristics is commercially available from Federal Materials Company, Inc., 2425 Wayne Sullivan Drive, Paducah, Ky. 42003.

Still another component of the simulated limestone 10 is pigment. As it is commonly known in the art, pigment is added to modify the color of the simulated limestone 10. In a preferred embodiment, the final coloration of the simulated limestone 10 is dependent upon the type and amount of pigment added. In certain embodiments, coloration of the simulated limestone 10 will be performed pursuant to the needs of the end user. In certain embodiments, from about 0.5% w/w to about 7% w/w of the simulated limestone 10 is a pigment. In a preferred embodiment, the simulated limestone 10 contains from about 1.1–1.6% w/w of pigment. In another preferred embodiment, 0.4% w/w of pigment is used. Specific examples of pigments that may be used with the invention described herein include, but are not limited to, polyester based pigment. Such pigments are commercially available from AOC, 860 Highway 57 East, Collierville, Tenn. 38017. Other pigments that may be used with the invention described herein are well known in the art and may be selected based upon the desired final coloration. The type and amount of pigment disclosed herein results in a coloration similar to natural limestone or colors similar to natural stone of any kind.

The simulated limestone 10 additionally comprises a catalyst which drives the chemical reactions necessary to provide the end product of the simulated limestone 10. An example of such a catalyst is Methyl-Ethyl Ketone Peroxide, abbreviated as MEKP-9. MEKP-9 is commercially available from Advanced Plastics, 7360 Cockrill Bend Blvd, Nashville, Tenn. 37209. In certain embodiments from about 0.9% w/w to about 1.25% w/w of MEKP-9 is provided to prepare the simulated limestone 10. In still other embodiments of the present invention, from about 0.27% w/w to about 0.41% w/w of a catalyst is used in the preparation of the simulated limestone 10. Other catalysts having characteristics similar, or equivalent, to the above-mentioned catalyst may be used in the present invention. As mentioned above, the specific catalyst to be used as well as the specific amount of that catalyst to be used is dependent upon the curing, or hardening characteristics that are desired. As commonly known in the art, generally, increasing the availability of the catalyst will increase the frequency and rate of chemical reactions which will, generally, result in a reduced amount of time required for curing, or hardening.

Based upon the above-mentioned characteristics of the components of the simulated limestone 10, disclosed herein are multiple formulations that may be used to prepare a simulated limestone 10. In certain embodiments, the simulated limestone 10, comprises from about 30% w/w to about 40% w/w of a base polyester resin, from about 10% w/w to about 20% w/w of an alumina trihydrate, from about 5% w/w to about 15% w/w of a microsphere 14, from about 10% w/w to about 20% w/w of sand 16, from about 0.5% w/w to about 7% w/w of a pigment, and from about 0.9% w/w to about 1.25% w/w of MEKP-9. In still other embodiments of the present invention, the simulated limestone 10, comprises from about 15% w/w to about 40% w/w of a base polyester resin, from about 10% w/w to about 40% w/w of an alumina trihydrate, form about 10% w/w to about 40% w/w of microsphere 14, from about 10% w/w to about 30% w/w of a sand 16, from about 0.5% w/w to about 7% w/w of a pigment, and from about 0.9% w/w to about 1.25% w/w of MEKP-9.

As shown in FIG. 1, the simulated limestone 10 has the appearance of natural limestone. The appearance of natural limestone is due primarily to the presence of sand 16. Production of the simulated limestone 10 as described herein will result in an end product that has the appearance of natural limestone.

The simulated limestone 10 of the present invention has reduced weight when compared to an identically sized piece of natural limestone. The presence of the microspheres 14 results in a reduced weight of the final product. In certain embodiments of the present invention the simulated limestone 10 has a weight of about 50% of an identically sized piece of natural limestone. In other embodiments, the simulated limestone 10 has a weight of about less than 75% of an identically sized piece of natural limestone. In still other embodiments, the simulated limestone 10 has a weight of about 35% of identical pre-cast concrete. In still other embodiments, the simulated limestone 10 has a weight of about less than 50% of identical pre-cast concrete. Such a reduction in weight is advantageous during the installation of the simulated limestone 10 on the external surface of a structure 18.

The manner of attaching simulated stone to the external surface of a structure is well known in the art. Briefly, the method of attachment is similar to the method of attachment of natural limestone. In the present invention, a metal strap is either fastened to the back of the simulated limestone or a metal strap is submerged in the simulated limestone formulation while it is still in the liquid state prior to hardening. The strap and simulated limestone are fastened to the exterior sheathing of a building structure and brick, stone, or E.I.F.S. (Exterior Insulated Finish Systems) cladding is used to enclose the simulated limestone. The simulated limestone has compression strength in excess of 10,000 psi and can withstand higher load bearing that any concrete product. Clearly, the reduced weight of the simulated limestone 10 results in reduced expense and reduced installation time when installing it.

The simulated limestone 10 of the present invention has been specifically designed and formulated in order to be capable of resisting damage by ultraviolet light, fire, water, and acid. In certain embodiments, the simulated limestone 10 is capable of resisting damage by ultraviolet light. In other embodiments, the simulated limestone 10 is capable of resisting damage by fire, water, and acid. In still other embodiments of the present invention, the simulated limestone 10 is additionally capable of resisting shrinkage.

The simulated limestone 10 has also been specifically formulated and designed in order to withstand the elements commonly encountered on the external surface of a building 18. Again, as stated previously, the simulated limestone 10 is also known as artificial limestone. In a certain embodiment, the simulated limestone 10 is capable of resisting compression strength of up to 15,229 pounds per square inch. In still other embodiments of the present invention, the simulated limestone 10 is resistant to damage by an impact of up to 0.45 ft-lb/in. Additionally, the simulated limestone 10 has been designed to have a low coefficient to thermal expansion and contraction. More specifically, the coefficient of linear thermal expansion is 3.8 E-05 per degree Celsius. Accordingly, the simulated limestone 10 is not susceptible to shrinkage or warpage. The ability of the simulated limestone 10 to avoid, or have reduced, expansion and contraction is a beneficial feature of the artificial limestone that provides exceptional enhancement of the aesthetic value of the structure to which it is attached. The enhancement of the aesthetic value of the structure is due to the fact that the substrate surface is not permeable to moisture or other debris. Since the simulated limestone 10, also known as artificial limestone, is capable of avoiding, or having reduced, effects from the wear and tear of the external environment, the product provides enhancement of the aesthetic value of the building for a surprisingly long period of time.

Disclosed herein is a method of producing the previously described simulated limestone, also known as artificial limestone. The method of producing the simulated stone comprises providing a mold, and pouring a simulated stone material, disclosed herein, into the mold. More specifically, the mold which is provided is constructed of a material capable of containing any of the formulations of the simulated limestone 10 which are described herein. Examples of materials of which the mold may be constructed, include, but are not limited to, epoxy based or aluminum based tooling. Other materials which may be used for the construction of molds for artificial or simulated rock or stone are well known in the art and may be used to construct a mold for the present invention. The mold is shaped to have the configuration which is desired for the shape and size of the simulated limestone 10.

After a model is provided, a formulation of the simulated limestone 10, as described herein, is poured into the mold. Obviously, pouring occurs during a time before the formulation solidifies, or hardens, into the final shape of the simulated limestone 10. The mechanical step of pouring a non-hardened artificial or simulated stone into a mold is well known in the art. Subsequent to pouring the formulation of the simulated limestone 10 into the mold, the formulation is allowed to cure, or harden. Subsequent to solidifying into the final shape of the simulated limestone 10, the mold is removed and the simulated limestone 10 is used as described herein. For all of the formulations described herein, the components are mixed using standard methods known in the art. Mixing of the elements of the formulations described herein is accomplished by using standard mixing equipment which is well known in the art. When mixing the formulations of the simulated limestone 10 disclosed herein, the mixing of the disclosed elements occurs at or around room temperature in order to achieve optimum quality. In certain embodiments, the method of producing a simulated stone requires pouring the simulated material into the mold within 5–10 minutes of adding MEKP-9.

Figure 4:
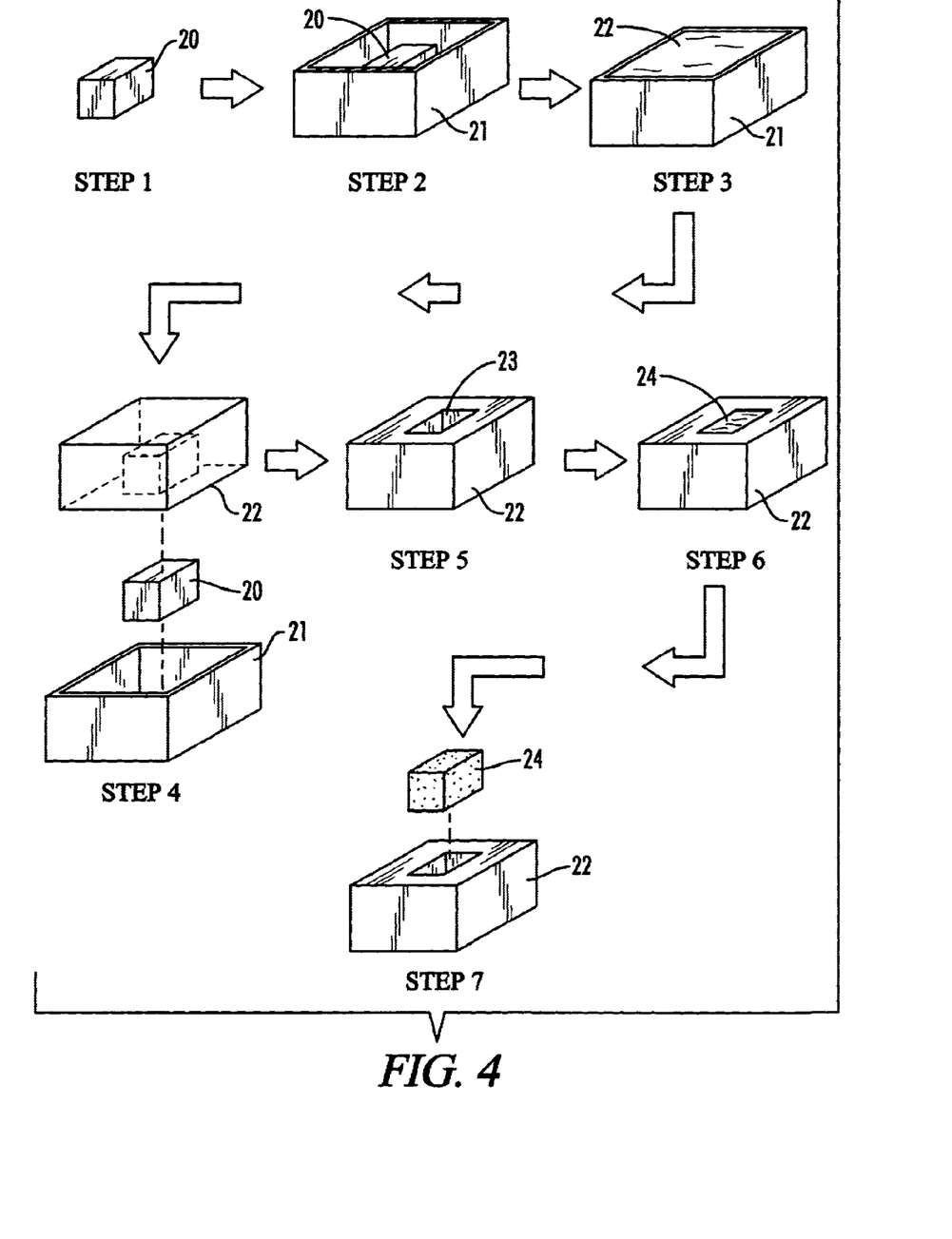

Also disclosed herein is a method of achieving a surface texture. In order for the simulated limestone 10 to have the natural appearance of limestone, in addition to the presence of the sand 16 which provides the aggregate look, it is beneficial to further achieve the appearance of natural limestone by utilizing the method of achieving a surface texture described herein. The method of achieving a surface texture comprises machining, as defined above, a foam material, as defined above, into the desired shape of the simulated limestone 10 so that the machined foamed material provides a male model 20.

As shown in FIG. 4, the male model 20 is placed in a container 21 such that the designed surface is facing up. As commonly known in the art, the male model 20 is prepared to be contacted by a polyurethane rubber material. Such polyurethane rubber material, as defined above, is poured into the container 21 and over, or on top of, the male model 20 so that the polyurethane rubber material solidifies, hardens, or cures, to form a female mold 22. Accordingly, it is the texture of the surface of the foam material that provides the unique texture of the polyurethane rubber material which forms the female mold 22. The female mold 22 has a cavity 23. Finally, a simulated stone material, also known as a formulation of the simulated limestone 10, described herein, is poured into the cavity 23 of the female mold 22. The resulting textured simulated stone 24 is male version of the female mold 22. Unless indicated otherwise, all steps of this method are performed at room temperature. Machining the foam material is performed as described previously herein. Additionally, the equipment used in the machining process is commercially available from H&H Tool Shop, 31 Industrial Park Drive, Hendersonville, Tenn. 37075.

Subsequent to pouring the simulated stone material into the female mold 22, the simulated stone material is provided sufficient time to solidify such that the textured simulated stone 24 is available for use as described herein after removal from the female mold 22. The amount of time required for curing of the textured simulated stone 24 is approximately 24 hours. The textured simulated stone 24 is removed from the female mold 22 by mechanical separation of the two materials. Briefly, the textured simulated stone 24 must be separated from the female mold 22 by manual force. After the vertical walls of the container 21 have been released, the female mold 22 and textured simulated stone 24 must be turned over on the top face. The female mold 22 is then removed from the textured simulated stone 24.

As shown in FIG. 4, a textured simulated stone 24, having the enhanced appearance of natural limestone, is produced according to the method of achieving a surface texture disclosed herein. Although FIG. 4 shows a textured simulated stone 24 having a specific shape, the method allows the foam material to be machined into any desired shape. Accordingly, the textured simulated stone 24, depicted in FIG. 4, reflects only one of any number of shapes that may be accomplished by the method disclosed herein.

The steps of pouring and curing the polyurethane rubber material are accomplished as commonly known in the art.

The following examples are illustrative of the invention, but should not be construed as limiting to the scope of the present invention. In all of the following examples, the listed ingredients are added and mixed as described herein. Each example additionally provides details regarding the conditions for curing, or hardening.

EXAMPLE 1

A simulated stone, also known as an artificial limestone, according to the invention described herein, is prepared using the following formulation:

40.82% w/w of a base polyester resin;

13.61% w/w of an alumina trihydrate;

16.33% w/w of a microsphere;

27.21% w/w of a sand;

1.63% w/w of a pigment; and 0.41% w/w of MEKP-9.

Subsequent to mixing the above-mentioned ingredients, the formulation should cure, or become hardened, within 20–35 minutes.

EXAMPLE 2

A simulated limestone 10, according to the invention described herein, is prepared using the following formulation:

34.13% w/w of a base polyester resin;

16.38% w/w of an alumina trihydrate;

20.48% w/w of a microsphere;

27.30% w/w of a sand;

1.37% w/w of a pigment; and 0.34% w/w of MEKP-9.

Subsequent to mixing the above-mentioned ingredients, the formulation should cure, or become hardened, within 20–35 minutes.

EXAMPLE 3

A simulated stone, also known as an artificial limestone, according to the invention described herein, is prepared using the following formulation:

27.40% w/w of a base polyester resin;

20.55% w/w of an alumina trihydrate;

23.29% w/w of a microsphere;

27.4% w/w of a sand;

1.10% w/w of a pigment; and 0.27% w/w of MEKP-9.

Subsequent to mixing the above-mentioned ingredients, the formulation should cure 20–35 minutes.

This patent application incorporates by reference all references, patents, and publications disclosed herein.

Thus, although there have been described particular embodiments of the present invention of a new and useful "Simulated Limestone and Method of Producing the Same", it is not intended that such references be construed as limitations upon the scope of this invention except as set forth in the following claims.

What is claimed is:

1. A simulated limestone, comprising:

from about 30% w/w to about 40% w/w of a base polyester resin;

from about 10% w/w to about 20% w/w of an alumina trihydrate;

from about 5% w/w to about 15% w/w of a microsphere;

from about 10% w/w to about 20% w/w of a sand;

from about 0.5% w/w to about 7% w/w of a pigment; and from about 0.9% w/w to about 1.25% w/w of a catalyst.

2. The simulated limestone of claim 1, wherein the simulated limestone has the appearance of natural limestone.

3. The simulated limestone of claim 1, wherein the simulated limestone has a weight of about less than 50% of an identically sized natural limestone.

4. The simulated limestone of claim 1, wherein the simulated limestone has a weight of about less than 40% of identical precast concrete.

5. The simulated limestone of claim 1, wherein the simulated limestone is capable of resisting damage by ultraviolet light, extreme temperatures, fire, water, and most acids.

6. The simulated limestone of claim 1, wherein the simulated limestone does not shrink after exotherm cure is complete.

7. The simulated limestone of claim 1, wherein the simulated limestone is resistant to damage by an impact of up to 0.45 ft-lb/in.

8. The simulated limestone of claim 1, wherein the simulated limestone has a coefficient of linear thermal expansion of about $3.8 \times 10^{-5}$ per degree Celsius.

9. An artificial limestone, comprising:

about 40.82% w/w of a base polyester resin;

about 13.61% w/w of an alumina trihydrate;

about 16.33% w/w of a microsphere;

about 27.21% w/w of a sand;

about 1.63% w/w of a pigment; and about 0.41% w/w of Methyl-Ethyl Ketone Peroxide.

10. The artificial limestone of claim 9, wherein the artificial limestone has the appearance of natural limestone.

11. The artificial limestone of claim 9, wherein the artificial limestone has a weight of about less than 50% of an identically sized natural limestone.

12. The artificial limestone of claim 9, wherein the artificial limestone has a weight of about less than 40% of identical pre-cast concrete.

13. The artificial limestone of claim 9, wherein the artificial limestone is capable of resisting damage by ultraviolet light, extreme temperatures, fire, water, and most acids.

14. The artificial limestone of claim 9, wherein the artificial limestone does not shrink after exotherm cure is complete.

15. The artificial limestone of claim 9, wherein the artificial limestone is resistant to damage by an impact of up to 0.45 ft-lb/in.

16. The artificial limestone of claim 9, wherein the artificial limestone has a coefficient of linear thermal expansion of about $3.8 \times 10^{-5}$ per degree Celsius.

17. A method of producing a simulated stone, comprising:
providing a mold;
and pouring into the mold a simulated limestone material comprising:
from about 30% w/w to about 40% w/w of a base polyester resin;
from about 10% w/w to about 20% w/w of an alumina trihydrate;
from about 5% w/w to about 15% w/w of a microsphere;
from about 10% w/w to about 20% w/w of a sand;
from about 0.5% w/w to about 7% w/w of a pigment; and
from about 0.9% w/w to about 1.25% w/w of a catalyst.

18. The method of claim 17, wherein pouring into the mold the simulated stone material further comprises pouring the simulated stone material into the mold within from about 5 minutes to about 7 minutes of adding the catalyst to the base polyester resin, the alumina trihydrate, the microsphere, the sand, and the pigment.

19. A method of achieving a surface texture, comprising:
machining a foam material into a desired shape so that a male model is formed; providing a container having a bottom surface, the container being capable of holding a polyurethane rubber material;
placing the male model on the bottom surface of the container;
pouring the polyurethane rubber material into the container so that the polyurethane
rubber material hardens to form a female mold; and
pouring into the female mold a simulated stone material comprising:
from about 30% w/w to about 40% w/w of a base polyester resin;
from about 10% w/w to about 20% w/w of an alumina trihydrate;
from about 5% w/w to about 15% w/w of a microsphere;
from about 10% w/w to about 20% w/w of a sand;
from about 0.5% w/w to about 7% w/w of a pigment; and
from about 0.9% w/w to about 1.25% w/w of a catalyst.

20. A simulated limestone, comprising:
from about 15% w/w to about 40% w/w of a base polyester resin;
from about 10% w/w to about 40% w/w of an alumina trihydrate;
from about 10% w/w to about 40% w/w of a microsphere;
from about 10% w/w to about 30% w/w of a sand;
from about 0.5% w/w to about 7% w/w of a pigment; and
from about 0.9% w/w to about 1.25% w/w of Methyl-Ethyl Ketone Peroxide.

* * * * *